(12) United States Patent
Saint et al.

(10) Patent No.: US 10,479,237 B2
(45) Date of Patent: Nov. 19, 2019

(54) REBOUND BAR ADAPTED FOR BEING SUPPORTED BETWEEN A CHILD SAFETY SEAT AND A BACKREST OF A CAR SEAT AND CHILD SAFETY ASSEMBLY THEREWITH

(71) Applicant: Wonderland Switzerland AG, Steinhausen (CH)

(72) Inventors: Esther R. Saint, West Reading, PA (US); Steven Glenn Gerhart, Reinholds, PA (US); Brad Thomas Bickley, Taipei (TW)

(73) Assignee: Wonderland Switzerland AG, Steinhausen (CH)

( * ) Notice: Subject to any disclaimer, the term of this patent is extended or adjusted under 35 U.S.C. 154(b) by 114 days.

(21) Appl. No.: 15/823,583

(22) Filed: Nov. 28, 2017

(65) Prior Publication Data
US 2018/0154803 A1 Jun. 7, 2018

Related U.S. Application Data

(60) Provisional application No. 62/428,537, filed on Dec. 1, 2016.

(51) Int. Cl.
*B60N 2/28* (2006.01)
(52) U.S. Cl.
CPC ......... *B60N 2/2884* (2013.01); *B60N 2/2821* (2013.01); *B60N 2/2839* (2013.01)
(58) Field of Classification Search
CPC .. B60N 2/2884; B60N 2/2821; B60N 2/2839; B60N 2/2863

USPC ...................................................... 297/216.11
See application file for complete search history.

(56) References Cited

U.S. PATENT DOCUMENTS

| | | | | |
|---|---|---|---|---|
| 5,468,014 A | * | 11/1995 | Gimbel | B60N 2/2821 180/268 |
| 5,722,720 A | * | 3/1998 | Lumley | B60N 2/2821 297/216.11 |
| 5,918,930 A | * | 7/1999 | Kawai | A47C 7/74 297/180.13 |
| 6,139,099 A | * | 10/2000 | Skold | B60N 2/28 297/216.11 |
| 9,434,279 B2 | | 9/2016 | Williams | |

(Continued)

FOREIGN PATENT DOCUMENTS

DE   42 22 692 C1   2/1994
EP   0 317 438 B1   3/1992

(Continued)

*Primary Examiner* — Gary C Hoge
(74) *Attorney, Agent, or Firm* — Winston Hsu (57) ABSTRACT

A rebound bar adapted for being supported between a child safety seat and a backrest of a car seat is disclosed. The rebound bar includes a main body and at least one shock absorbing portion. The main body is connected to one of a seat portion and a base portion of the child safety seat. The at least one shock absorbing portion combined with the main body for absorbing an impact from the backrest. The at least one shock absorbing portion can produce deformation when the rebound bar receives the impact from the backrest. Therefore, it can effectively reduce risk of injury to a child. Furthermore, a child safety seat assembly having the aforementioned rebound bar is disclosed.

10 Claims, 5 Drawing Sheets

(56) References Cited

U.S. PATENT DOCUMENTS

| | | | | |
|---|---|---|---|---|
| 2010/0060046 A1* | 3/2010 | Vertegaal | ............. | B60N 2/2824 |
| | | | | 297/216.11 |
| 2011/0254331 A1* | 10/2011 | Nagelski | .............. | B60N 2/2806 |
| | | | | 297/216.11 |
| 2014/0284977 A1* | 9/2014 | Williams | ............. | B60N 2/2821 |
| | | | | 297/250.1 |
| 2014/0354021 A1* | 12/2014 | Sedlack | ............... | B60N 2/2821 |
| | | | | 297/216.11 |
| 2016/0121764 A1* | 5/2016 | Clement | ............. | B60N 2/2884 |
| | | | | 297/216.11 |
| 2016/0200225 A1* | 7/2016 | Van Der Veer | ...... | B60N 2/2812 |
| | | | | 297/256.16 |
| 2016/0332542 A1* | 11/2016 | Cohen | ................... | B60N 2/2887 |
| 2018/0126877 A1* | 5/2018 | Williams | ............ | B60N 2/2851 |
| 2019/0135141 A1* | 5/2019 | Bennett | ................ | B60N 2/2839 |

FOREIGN PATENT DOCUMENTS

| | | |
|---|---|---|
| EP | 1 526 034 A1 | 4/2005 |
| JP | 2007-283780 A | 11/2007 |
| KR | 10-2013-0042339 A | 4/2013 |
| WO | 2013/061308 A2 | 5/2013 |

* cited by examiner

FIG. 7

REBOUND BAR ADAPTED FOR BEING SUPPORTED BETWEEN A CHILD SAFETY SEAT AND A BACKREST OF A CAR SEAT AND CHILD SAFETY ASSEMBLY THEREWITH

CROSS REFERENCE TO RELATED APPLICATIONS

This application claims the benefit of U.S. Provisional Patent Application No. 62/428,537 filed on Dec. 1, 2016, which is hereby incorporated by reference in its entirety.

BACKGROUND OF THE INVENTION

1. Field of the Invention

The present invention relates to a child product, and more particularly, to a rebound bar adapted for being supported between a child safety seat and a backrest of a car seat and a child safety seat assembly therewith.

2. Description of the Prior Art

A child riding in a vehicle should sit in a child car seat installed on a car seat instead of sitting on the car seat directly due to safety concern. A child car seat can be installed on a car seat of a car forwardly or rearwardly according to practical demands. When the child car seat is located at a forward position, a child sitting in the child car seat faces forward. When the child car seat is located at a rearward position, the child faces a backrest of the car seat and a rebound bar of the child car seat is utilized to abut against the backrest of the car seat. In such a way, when a traffic accident occurs and the car receives an impact, the rebound bar can prevent the rearward child car seat from overturning toward the car seat. However, an impact force directly from the backrest of the car seat to the conventional rebound bar is still too large for a small child. It is desirable to improve structure of the conventional rebound bar, so as to reduce risk of injury to a child.

SUMMARY OF THE INVENTION

Therefore, an objective of the present invention is to provide a rebound bar adapted for being supported between a child safety seat and a backrest of a car seat and a child safety seat assembly therewith for solving the aforementioned problems.

In order to achieve the aforementioned objective, the present invention discloses a rebound bar adapted for being supported between a child safety seat and a backrest of a car seat. The rebound bar includes a main body and at least one shock absorbing portion. The main body is connected to one of a seat portion and a base portion of the child safety seat. The at least one shock absorbing portion is combined with the main body for absorbing an impact from the backrest to prevent rearward rotation of the child safety seat.

According to an embodiment of the present invention, the main body is formed in a U shape and includes a first segment, a second segment and a third segment. An end of the third segment is connected to an end of the first segment. Another end of the third segment is connected to an end of the second segment. Another end of the first segment is connected to the one of the seat portion and the base portion of the child safety seat, and another end of the second segment is connected to the one of the seat portion and the base portion of the child safety seat.

According to an embodiment of the present invention, the at least one shock absorbing portion is integrally combined with at least one of the first segment, the second segment and the third segment of the main body.

According to an embodiment of the present invention, the at least one shock absorbing portion is detachably combined with the at least one of the first segment, the second segment and the third segment of the main body.

According to an embodiment of the present invention, the at least one shock absorbing portion is located a position near a connection of the main body and the one of the seat portion and the base portion of the child safety seat.

According to an embodiment of the present invention, the at least one shock absorbing portion is made of elastic material, plastic material, or metal material.

According to an embodiment of the present invention, the at least one shock absorbing portion is a spring, a honeycomb structure, or an air cell structure.

According to an embodiment of the present invention, the at least one shock absorbing portion is a sandwich structure.

According to an embodiment of the present invention, the at least one shock absorbing portion includes a first lamination, a second lamination, a honeycomb component and at least one resilient component. The at least one resilient component is connected to the first lamination and the second lamination. The honeycomb component is installed between the first lamination and the second lamination and separated from at least one of the first lamination and the second lamination when the first lamination and the second lamination are unforced, and deformation of the at least one resilient component occurs before crack of the honeycomb component when the first lamination and the second lamination are forced to move close to each other.

In order to achieve the aforementioned objective, the present invention further discloses a child safety seat assembly including a child safety seat and a rebound bar. The child safety seat includes a seat portion and a base portion. The rebound bar is supported between the child safety seat and a backrest of a car seat. The rebound bar includes a main body and at least one shock absorbing portion. The main body is connected to one of the seat portion and the base portion of the child safety seat. The at least one shock absorbing portion is combined with the main body for absorbing an impact from the backrest to prevent rearward rotation of the child safety seat.

In summary, the rebound bar of the present invention utilizes deformation of the shock absorbing portion for absorbing the impact from the backrest of the car seat. When the impact is small, the shock absorbing portion can be resiliently deformed. When the impact is large, the shock absorbing portion can be permanently deformed or cracked. Therefore, it can provide an enhanced buffering effect and effectively reduce risk of injury to a child.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure (s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
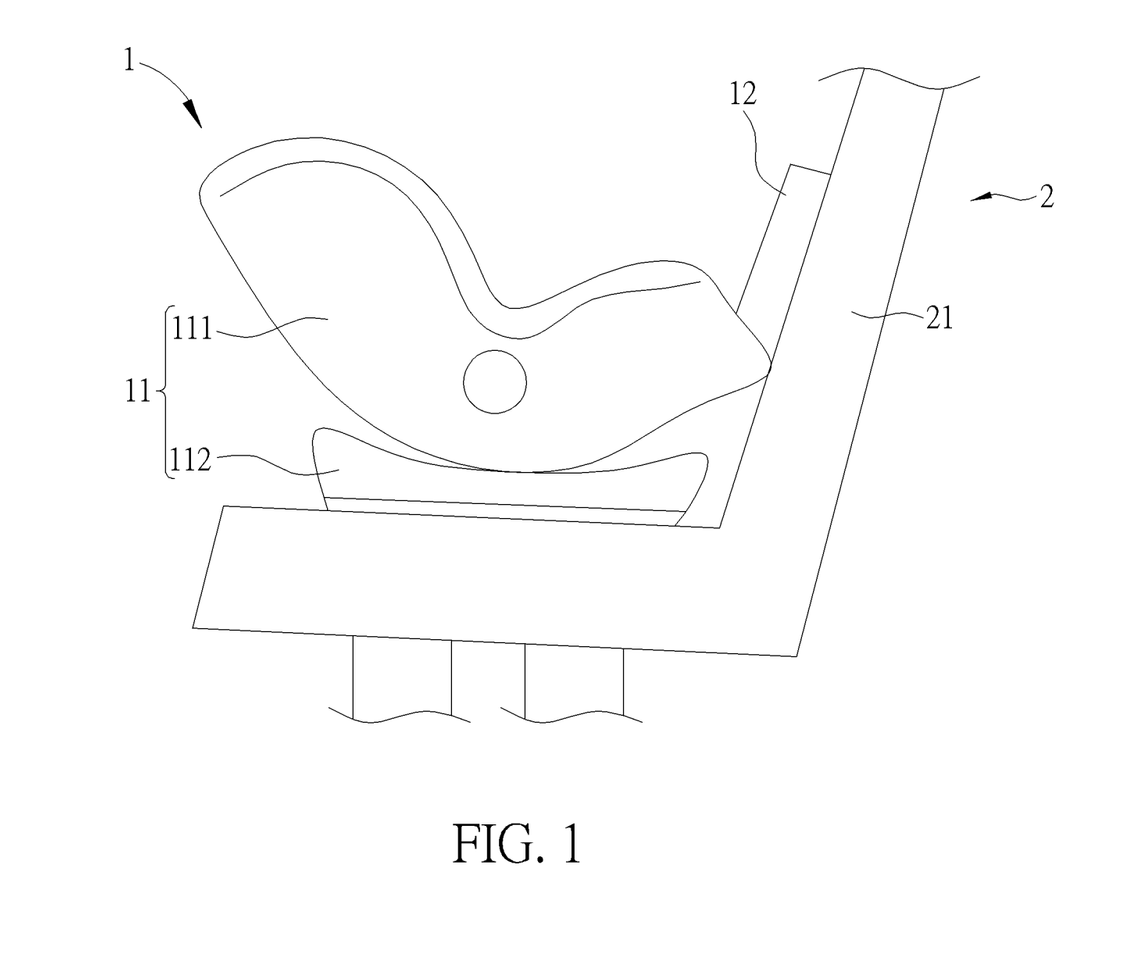
FIG. 1 is a schematic diagram of a child safety seat assembly according to an embodiment of the present invention.
Figure 2:
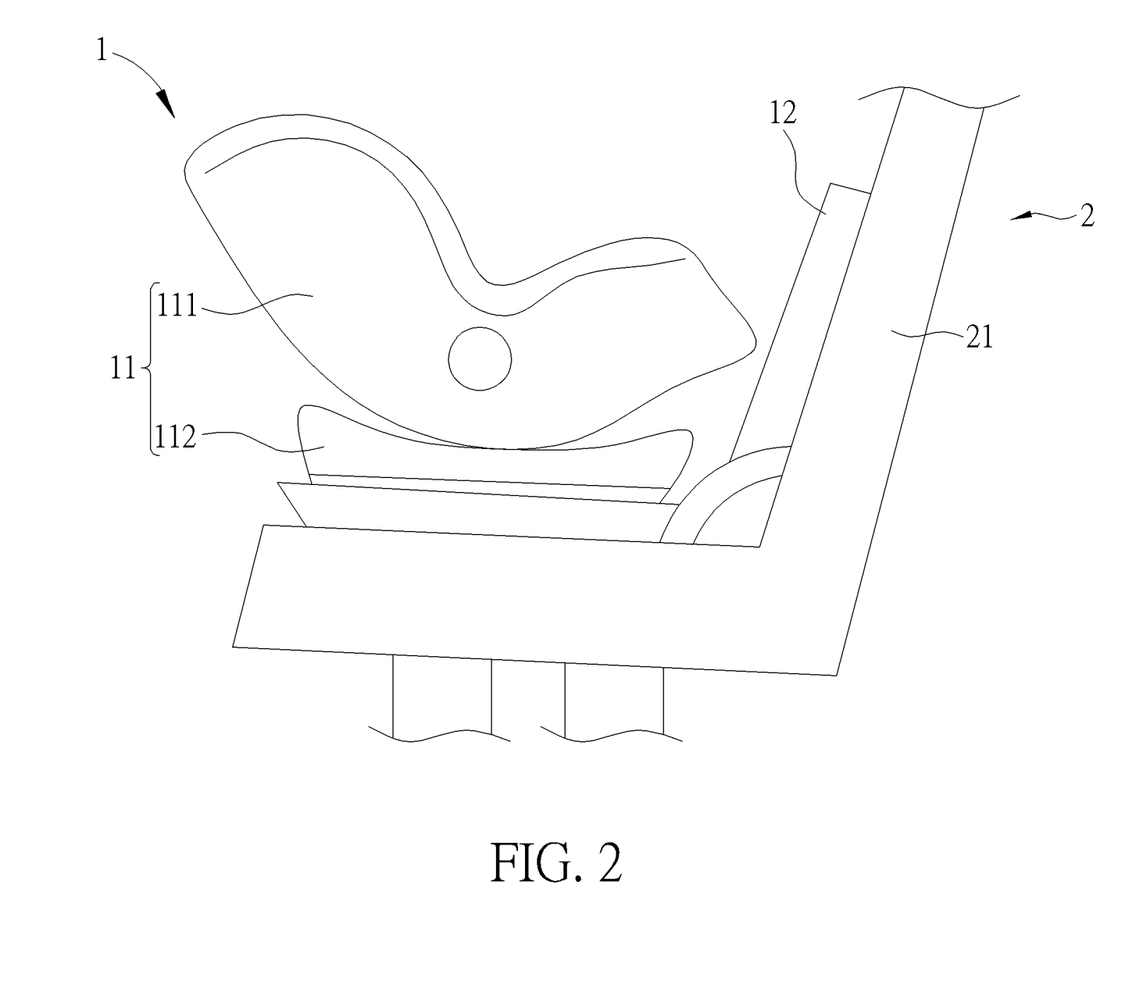
FIG. 2 is a schematic diagram of a child safety seat assembly according to another embodiment of the present invention.

Please refer to FIG. 1. FIG. 1 is a schematic diagram of a child safety seat assembly 1 according to an embodiment of the present invention. As shown in FIG. 1, the child safety seat assembly 1 is installed on a car seat 2 at a rearward position and includes a child safety seat 11 and a rebound bar 12. The child safety seat 11 includes a seat portion 111 and a base portion 112. The rebound bar 12 is connected to the seat portion 111 and supported between the child safety seat 11 and a backrest 21 of the car seat 2 for preventing the child safety seat 11 from overturning toward the backrest 21 rearwardly when the child safety seat assembly 1 is installed on the car seat 2 at the rearward position. However, structure of the child safety seat assembly 1 is not limited to this embodiment. For example, please refer to FIG. 2. FIG. 2 is a schematic diagram of the child safety seat assembly 1 according to another embodiment of the present invention. As shown in FIG. 2, in this embodiment, the rebound bar 12 also can be connected to the base portion 112 of the child safety seat 11 to be supported between the child safety seat 11 and the backrest 21.

Figure 3:
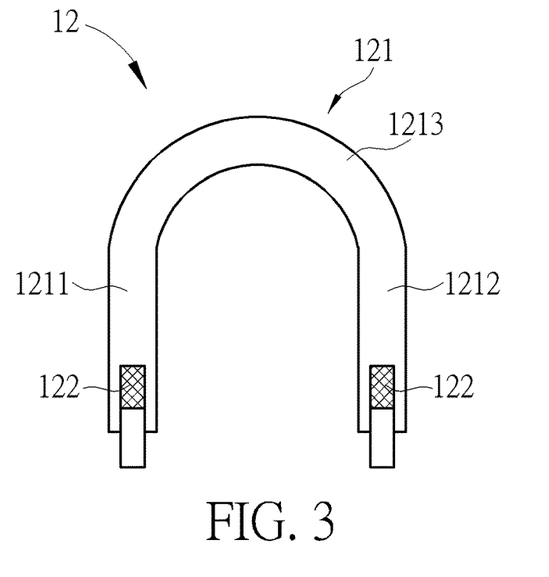
FIG. 3 to FIG. 6 are diagrams of a rebound bar according to different embodiment of the present invention.

Please refer to FIG. 3 to FIG. 6. FIG. 3 to FIG. 6 are diagrams of the rebound bar 12 according to different embodiments of the present invention. As shown in FIG. 3, in this embodiment, the rebound bar 12 includes a main body 121 and two shock absorbing portions 122. The main body 121 is substantially formed in a U shape and includes a first segment 1211, a second segment 1212 and a third segment 1213. An end of the third segment 1213 is connected to an end of the first segment 1211. Another end of the third segment 1213 is connected to an end of the second segment 1212. The first segment 1211, the second segment 1212 and the third segment 1213 can be integrally formed. Another ends of the first segment 1211 and the second segment 1212 can be connected to one of the seat portion 111 and the base portion 112 of the child safety seat 11. The third segment 1213 is for abutting against the backrest 21 of the car seat 2. The two shock absorbing portions 122 are combined with the first segment 1211 and the second segment 1212 of the main body 121 for absorbing an impact from the backrest 21. The two shock absorbing portions 122 are located at positions near connection of the first segment 1211 and the seat portion 111 and connection of the second segment 1212 and the seat portion 111, respectively. Specifically, in this embodiment, the two shock absorbing portions 122 are located near the another ends of the first segment 1211 and the second segment 1212, respectively. In an embodiment, the two shock absorbing portions 122 can be detachable from the first segment 1211 and the second segment 1212 of the main body 121 for replacement.

Figure 4:
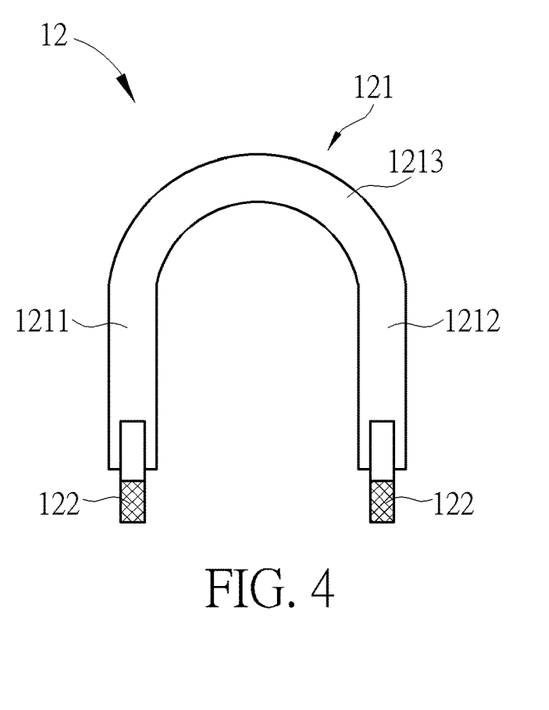
Figure 5:
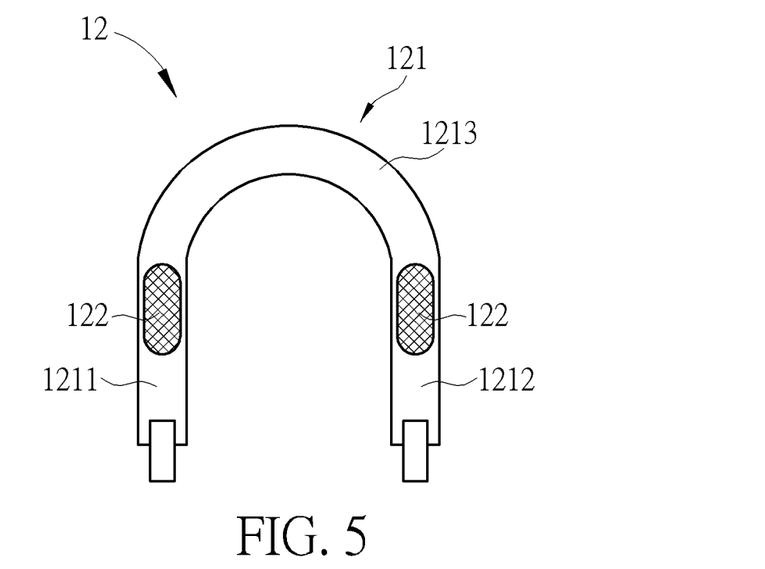
Figure 6:
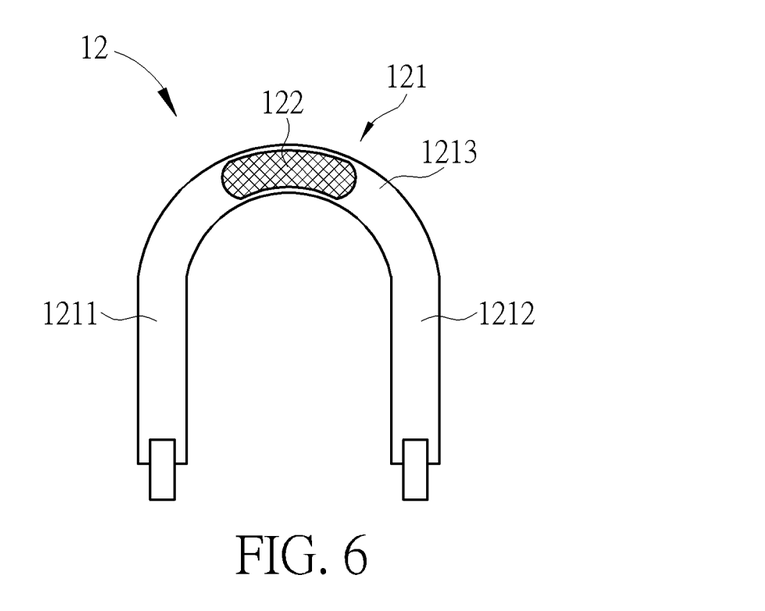

As shown in FIG. 4, in this embodiment, the rebound bar 12 can include the two shock absorbing portions 122 combined with the first segment 1211 and the second segment 1212. The two shock absorbing portions 122 are located at other positions near the connection of the first segment 1211 and one of the seat portion 111 and the base portion 112 and the connection of the second segment 1212 and the one of the seat portion 111 and the base portion 112, respectively. Specifically, in this embodiment, the two shock absorbing portions 122 are located near the one of the seat portion 111 and the base portion 112 instead of the another ends of the first segment 1211 and the second segment 1212. As shown in FIG. 5, in this embodiment, the rebound bar 12 can include the two shock absorbing portions 122 integrally combined with the first segment 1211 and the second segment 1212 and located at middle portions of the first segment 1211 and the second segment 1212. As shown in FIG. 6, in this embodiment, the rebound bar 12 can only include one shock absorbing portion 122 integrally combined with the third segment 1213 and located at a middle portion of the third segment 1213.

Furthermore, the shock absorbing portion 122 of the present invention can be a spring, a honeycomb structure, an air cell structure, or a composite structure, such as a sandwich structure. Besides, the shock absorbing portion 122 of the present invention can be made of elastic material (such as foam), plastic material (such as PVC), or metal material (such as aluminum). However, it is not limited thereto. It depends on practical demands.

When the child safety seat assembly 1 is installed on the car seat 2 at the rearward position, the rebound bar 12 abuts against the backrest 21 of the car seat 2. When a traffic accident occurs and the rebound bar 12 receives an impact from the backrest 21, the two shock absorbing portions 122 can be forced to be deformed to absorb the impact for reducing risk of injury to a child. It should be noticed that when the impact is small, the two shock absorbing portions 122 can be forced to be resiliently deformed to absorb the impact due to material property thereof. Since deformation of the shock absorbing portion 122 is recoverable, the two shock absorbing portions 122 can recover to original conditions when the rebound bar 12 is released. When the impact is large, the two shock absorbing portions 122 might be forced to be permanently deformed or collapsed to absorb the impact. However, in this case, the two shock absorbing portions 1222 can be designed to be unrecoverable due to structural failure and should be replaced with new ones later. In such a way, the present invention can provide an enhanced buffering effect.

Figure 7:
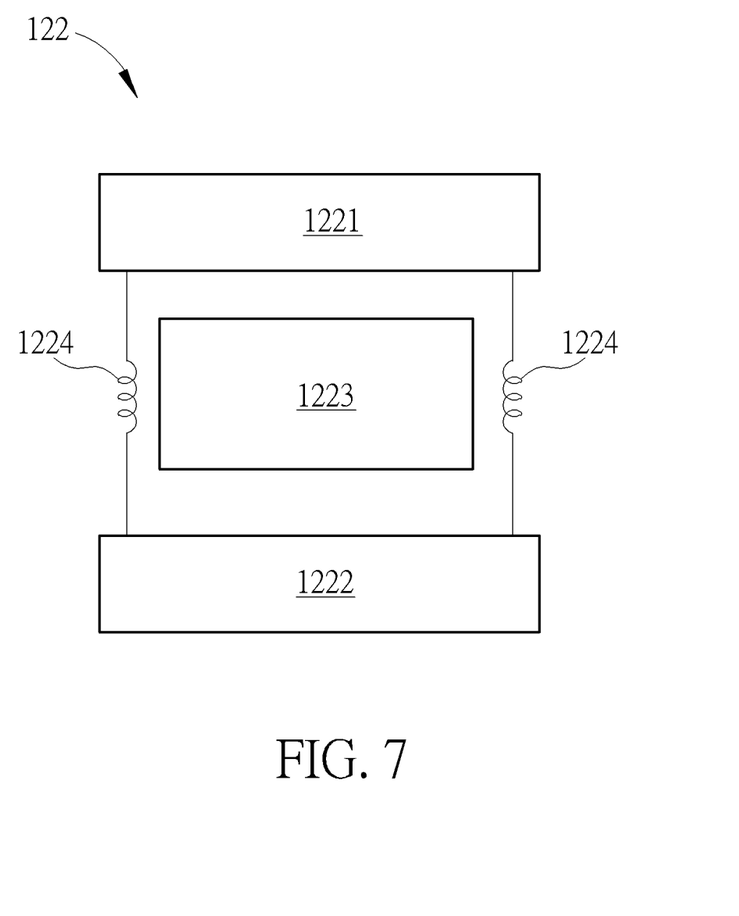
FIG. 7 is a diagram of a shock absorbing portion according to another embodiment of the present invention.

Please further refer to FIG. 7. FIG. 7 is a diagram of the shock absorbing portion 122 according to another embodiment of the present invention. As shown in FIG. 7, in this embodiment, the shock absorbing portion 122 can be a sandwich structure and include a first lamination 1221, a second lamination 1222, a honeycomb component 1223 and at least one resilient component 1224. The honeycomb component 1223 can be an injection-molded plastic honeycomb structure or a metal honeycomb structure. The material of the honeycomb component 1223 can be selected upon the requirement of capability for absorbing the impact. The resilient component 1224 can be a spring, and the number of the resilient component 1224 can be determined according to practical demands. The at least one resilient component 1224 is connected to the first lamination 1221 and the second lamination 1222. The honeycomb component 1223 is installed between the first lamination 1221 and the second lamination 1222 and separated from at least one of the first lamination 1221 and the second lamination 1222 at a predetermined distance when the first lamination 1221 and the second lamination 1222 are unforced. When the first lamination 1221 and the second lamination 1222 are forced to move close to each other by a small impact and a moving distance of the first lamination 1221 relative to the second lamination 1222 is equal to or less than the predetermined distance, only the at least one resilient component 1224 is forced to be resiliently deformed. When the shock absorbing portion is released, the first lamination 1221 and the second lamination 1222 can be recovered by the at least one compressed resilient component 1224. When the first lamination 1221 and the second lamination 1222 are forced to move close to each other by a large impact and the moving distance of the first lamination 1221 relative to the second lamination 1222 is greater than the predetermined distance, the at least one resilient component 1224 is forced to be resiliently deformed in the first stage, and then the honeycomb component 1223 is resiliently deformed or even permanently cracked by the first lamination 1221 and the second lamination 1222 to absorb the large impact in the second stage. That is, deformation of the at least one resilient component 1224 occurs before deformation or crack of the honeycomb component 1223 when the first lamination 1221 and the second lamination 1222 are forced to move close to each other. The two stages of shock absorption can provide an enhanced protecting effect for the child.

In contrast to the prior art, the rebound bar of the present invention utilizes deformation of the shock absorbing portion for absorbing the impact from the backrest of the car seat. When the impact is small, the shock absorbing portion can be resiliently deformed. When the impact is large, the shock absorbing portion can be permanently deformed or cracked. Therefore, it can provide an enhanced buffering effect and effectively reduce risk of injury to a child.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A rebound bar adapted for being supported between a child safety seat and a backrest of a car seat, the rebound bar comprising:
   a main body connected to one of a seat portion and a base portion of the child safety seat; and
   at least one shock absorbing portion combined with the main body for absorbing an impact from the backrest, wherein the at least one shock absorbing portion is a sandwich structure, the at least one shock absorbing portion comprises a first lamination, a second lamination, a honeycomb component and at least one resilient component, the at least one resilient component is connected to the first lamination and the second lamination, the honeycomb component is installed between the first lamination and the second lamination and separated from at least one of the first lamination and the second lamination when the first lamination and the second lamination are unforced, and deformation of the at least one resilient component occurs before crack of the honeycomb component when the first lamination and the second lamination are forced to move close to each other.

2. The rebound bar of claim 1, wherein the main body is formed in a U shape and comprises a first segment, a second segment and a third segment, an end of the third segment is connected to an end of the first segment, another end of the third segment is connected to an end of the second segment, another end of the first segment is connected to the one of the seat portion and the base portion of the child safety seat, and another end of the second segment is connected to the one of the seat portion and the base portion of the child safety seat.

3. The rebound bar of claim 2, wherein the at least one shock absorbing portion is integrally combined with at least one of the first segment, the second segment and the third segment of the main body.

4. The rebound bar of claim 2, wherein the at least one shock absorbing portion is detachably combined with at least one of the first segment, the second segment and the third segment of the main body.

5. The rebound bar of claim 1, wherein the at least one shock absorbing portion is located a position near a connection of the main body and the one of the seat portion and the base portion of the child safety seat.

6. A child safety seat assembly comprising:
   a child safety seat comprising a seat portion and a base portion; and
   a rebound bar supported between the child safety seat and a backrest of a car seat, the rebound bar comprising:
      a main body connected to one of the seat portion and the base portion of the child safety seat; and
      at least one shock absorbing portion combined with the main body for absorbing an impact from the backrest, wherein the at least one shock absorbing portion is a sandwich structure, the at least one shock absorbing portion comprises a first lamination, a second lamination, a honeycomb component and at least one resilient component, the at least one resilient component is connected to the first lamination and the second lamination, the honeycomb component is installed between the first lamination and the second lamination and separated from at least one of the first lamination and the second lamination when the first lamination and the second lamination are unforced, and deformation of the at least one resilient component occurs before crack of the honeycomb component when the first lamination and the second lamination are forced to move close to each other.

7. The child safety seat assembly of claim 6, wherein the main body is formed in a U shape and comprises a first segment, a second segment and a third segment, the third segment is connected to an end of the first segment and an end of the second segment, another end of the first segment is connected to the one of the seat portion and the base portion of the child safety seat, and another end of the second segment is connected to the one of the seat portion and the base portion of the child safety seat.

8. The child safety seat assembly of claim 7, wherein the at least one shock absorbing portion is integrally combined with at least one of the first segment, the second segment and the third segment of the main body.

9. The child safety seat assembly of claim 7, wherein the at least one shock absorbing portion is detachably combined with at least one of the first segment, the second segment and the third segment of the main body.

10. The child safety seat assembly of claim 6, wherein the at least one shock absorbing portion is located a position near a connection of the main body and the one of the seat portion and the base portion of the child safety seat.

* * * * *

UNITED STATES PATENT AND TRADEMARK OFFICE
CERTIFICATE OF CORRECTION

PATENT NO.           : 10,479,237 B2
APPLICATION NO.      : 15/823583
DATED                : November 19, 2019
INVENTOR(S)          : Esther R. Saint et al.

Page 1 of 1

It is certified that error appears in the above-identified patent and that said Letters Patent is hereby corrected as shown below:

On the Title Page

Item (54) and in the Specification, Column 1, Line 1 to 5, correct the title from "REBOUND BAR ADAPTED FOR BEING SUPPORTED BETWEEN A CHILD SAFETY SEAT AND A BACKREST OF A CAR SEAT AND CHILD SAFETY ASSEMBLY THEREWITH" to
--REBOUND BAR ADAPTED FOR BEING SUPPORTED BETWEEN A CHILD SAFETY SEAT AND A BACKREST OF A CAR SEAT AND CHILD SAFETY SEAT ASSEMBLY THEREWITH--.

Signed and Sealed this
Twenty-fifth Day of February, 2020

Andrei Iancu
*Director of the United States Patent and Trademark Office*